Patented Oct. 13, 1936

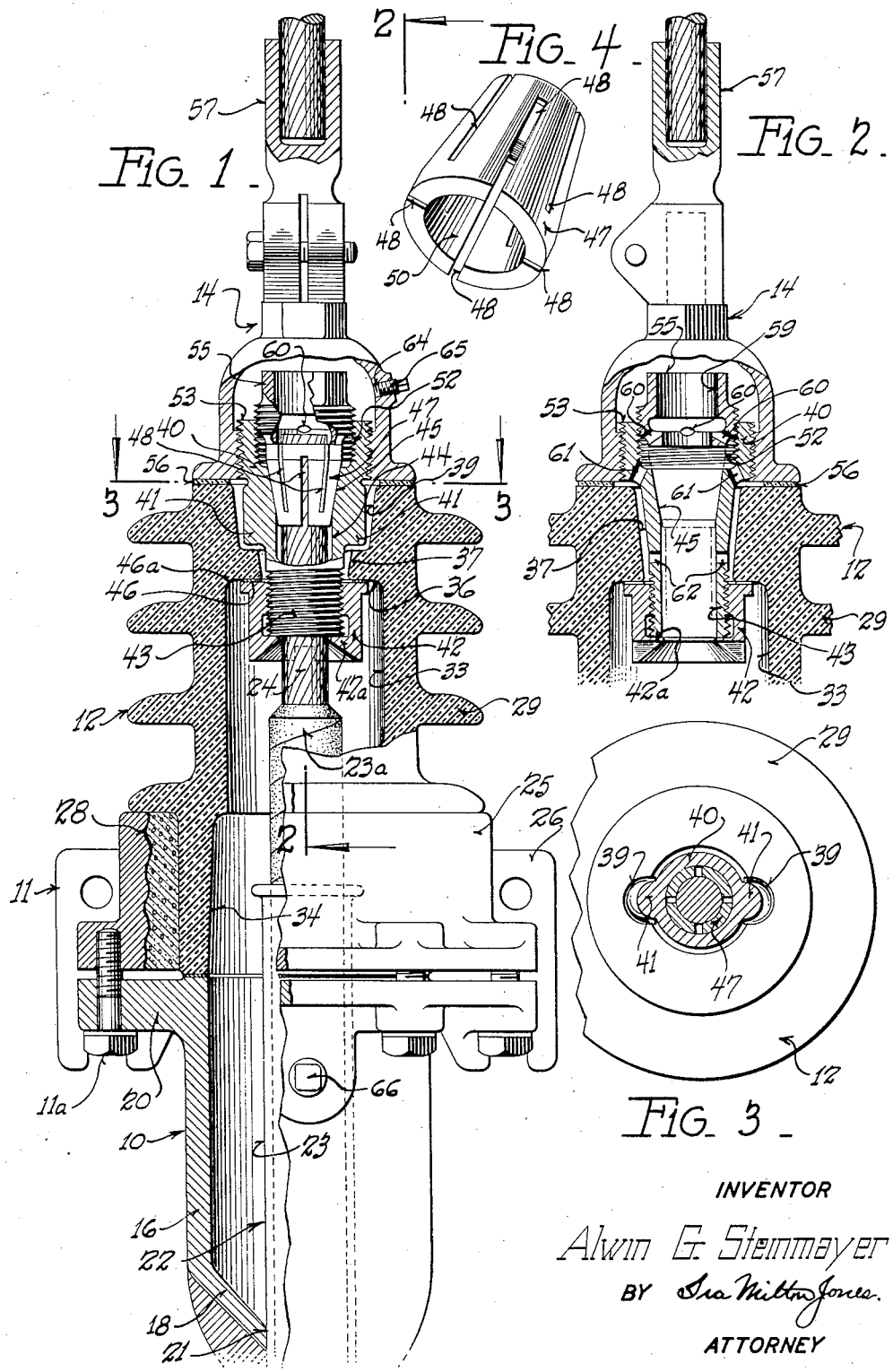

2,057,069

UNITED STATES PATENT OFFICE 2,057,069

OIL-FILLED POT HEAD

Alwin G. Steinmayer, Milwaukee, Wis., assignor to The Line Material Company, South Milwaukee, Wis., a corporation of Wisconsin Application September 11, 1931, Serial No. 562,221

5 Claims. (Cl. 173—353)

This invention relates to certain new and useful improvement in pot heads, more particularly to oil filled pot heads adapted to make connection between underground and overhead wiring.

It is an object of the present invention to produce a pot head in which the wire is clamped into a socket in the upper part of the pot head, thus eliminating soldering, and producing a joint which may readily be inspected from time to time.

A further object of the invention is to provide a pot head in which the joint can be made and the pot head assembled before filling with oil.

It is a further object of the invention to provide means whereby the pot head may be entirely filled with oil after assembly.

It is a further object of the invention to generally simplify the construction of pot heads, reduce the cost thereof and other objects will become apparent as the description proceeds.

The drawing shows a preferred form of the improved pot head embodying the details of the present invention in which:

Figure 1 is an elevational view, partly in cross section showing details of the improved pot head;

Figure 2 is a detail view of the clamping head shown partly in cross section;

Figure 3 is a cross section on the plane of the line 3—3 of Figure 1; and

Figure 4 is a detail in perspective showing the wire clamping unit.

Referring to the drawing in which like numerals indicate like parts throughout the several views, the pot head comprises a sleeve 10 fastened to a mounting bracket 11 by screws 11a or other suitable means, an insulator bushing 12 and a connector head, generally designated 14.

The sleeve 10 comprises a hollow cylindrical portion 16 terminating at the lower end thereof in a conical member 18 at one end and a flange 20 at the upper end through which the screws or other suitable means 11a pass to attach the sleeve to the bracket 11.

The conical portion 18 is provided with a hole 21 through which a cable generally designated 22 passes. The cable 22 may comprise a lead sheath 23, a layer of insulating material 23a and the conductor 24. The cable 22 is passed through the hole 21 and fixed in the pot head by means of a wiped joint between the lead sheath 23 of the cable, and the conical member 18 of the sleeve 10. Other means than a wiped joint may be used to form the connection between the cable and the conical member 18 the main feature being to provide a fluid-tight joint at this point.

The bracket 11 comprises a cylindrical portion 25 and an attaching portion 26 provided with a plane face to fit on the cross arm of a pole or other suitable support.

The cylindrical portion 25 is formed with a cylindrical recess 28 accommodating the insulator bushing 12. The connection between the insulating bushing 12 and the bracket 11 is made by filling the annular space between the two with a mixture of suitable cement. The bushing 12 may be made of porcelain or other suitable insulating material and has a plurality of ribs 29 thereon to increase the flash distance.

The bushing 12 has a cylindrical bore 33 which opens into a slightly enlarged bore 34 at the lower end and terminates in a shoulder 36 and bore 37 at the upper end. The bore 34 corresponds in size to the interior of the cylindrical portion 16 of the sleeve 10. The bore 37 is slightly conical in shape as shown in Fig. 2 and has a pair of recesses 39 cut into the sides thereof which recesses cooperate to mount a bushing 40.

The bushing 40 has lugs 41 which fit into the recesses 39 to hold the bushing against turning. A nut 42 fits over the lower threaded end of the bushing 40 and has a shoulder 42a which abuts the lower end of the threaded portion 43 on the bushing 41 to limit axial movement thereof.

The bushing is provided with an interior cylindrical bore 44 slightly greater in diameter than the wire 24, which terminates in a frusto-conical bore 45 which seats a conical clamping member generally designated 47, the clamping member being best shown in Figs. 1 and 4.

This clamping member 47 is provided with a plurality of slots 48 which alternately split the bushing from the top and bottom to points adjacent the bottom and top respectively of the bushing. The bore 50 of the clamping member 47 while generally cylindrical, is shaped to fit the wire 24 and is adapted to contract a limited amount upon application of compression by virtue of the slots 48 whereupon the wire is securely gripped.

The wire 24 of the cable 22 passes through the cylindrical bore 44 of the bushing 40 and enters the cylindrical bore 50 of the conical clamping member 47. The bushing 40 is provided with internal and external threads 52 and 53 respectively. A tubular clamping plug 55 having external threads thereon engages the threads 52 on the interior of the bushing 40 and clamps down on the conical clamping member 47 forcing it down into the tapered bore 45 and wedging it between the tapered bore and the wire 24. The wire is thus firmly anchored and a good electrical connection is established between the wire and the bushing 40.

The external threads 53 on the bushing 40 are engaged by a cap member or connector head which has been generally designated 14. This cap member rests on the insulator 12 with a gasket 56 interposed therebetween so that screwing the cap member onto the bushing 40 draws the projections 41 off their seats and compresses the gasket 46a between the shoulder 46 on the nut 42 and the shoulder 36 in the insulator 12. Obviously, the gasket 56 is also compressed during the application of the cap to insure a fluid tight connection between the cap and the insulator.

The connector head or cap 14 is made hollow and has a wire clamp 57 connected to the upper end thereof. This wire clamp may be of any conventional design, as it forms no part of the present invention.

Channels are formed through the various members of the pot head to permit the free passage of oil through the interior thereof. These passages will now be described in more detail.

The plug 55 is hollow as shown at 59 and is provided with a plurality of ports 60 which open into the space between the conical clamping member 47 and the internal thread 52 of the bushing 40. This space communicates thru a plurality of ports 61 with the space between the exterior of the bushing 40 and the interior of the bore 37. The latter space communicates with the interior of the bushing by means of a plurality of ports 62 through which oil may freely pass from the latter named space through the interior of the bushing between the wall of the bore 44 and the wire 24 into the interior 33 and 34 of the insulator bushing and into the cylindrical member 16.

The cap or connector head 14 is provided with a vent port 64 adjacent the upper end thereof which is closed by a plug 65 while the sleeve 10 is provided with a port 66, which may be closed by a suitable plug, for filling the pot head with oil.

In operation the cable 22 is connected to the conical portion 18 of the sleeve 10 and the cable 24 is connected to the pot head through the conical clamping member 47, in the manner hereinbefore described.

By applying a suitable instrument to the port 66 and uncovering the port 64 oil may be forced into the sleeve 10 and thence under pressure through the cylindrical bores 33 ad 34 through the various passages in the bushing 40 and the plug 55 and into the interior of the cap 14.

When the entire pot head is filled, oil will run out of the port 64. The plug 65 may then be fitted in place and the apparatus for supplying the oil disconnected from the port 66 and the plug thereto inserted in place to leave the pot head completely filled with oil.

It will be seen that there has been provided a relatively simple apparatus whereby a cable may be releasably clamped within a pot head and whereby the pot head may be conveniently filled with oil so as to exclude all air therefrom and preclude the entry of water into the cable.

It is realized that this invention is susceptible to various changes in modification coming well within the scope of one skilled in the art and it is not, therefore, desired to limit the invention to the precise form herein shown and described, but only by the scope of the appended claims.

What is claimed as new and desired to secure by Letters Patent is:

1. In a pot head for connecting electrical cables, the combination with a tubular insulator having a bore abruptly restricted near one end to afford a shoulder interiorly of the insulator, of a tubular member into which the bared end of a cable extends, means on said tubular member to engage said shoulder and hold said member against movement outwardly of said insulator, means carried by the outer portion of said member exteriorly of said shoulder to grip and firmly anchor the cable to said member, a hollow cap having its open end resting on the end of the insulator to close the open end thereof, and a threaded connection between the cap and said tubular member, whereby rotation of the cap simultaneously draws the tubular member outwardly to engage the first mentioned means with the shoulder and draws the cap down onto the insulator.

2. In a pot head for connecting electrical cables, the combination with a tubular insulator having a bore of given diameter terminating in a smaller bore opening at one end of the insulator, whereby to provide a shoulder interiorly of the insulator, of a bushing in said smaller bore having a threaded end extended past said shoulder, a nut engaged with said threaded end adjacent said shoulder, said bushing and nut being apertured coaxially to receive the bared end of a cable, and clamping means on said bushing for securing said bared end in said apertures.

3. In a pot head for connecting electrical cables, the combination with a tubular insulator having a bore abruptly restricted near one end to afford a shoulder interiorly of the insulator, of a tubular member into which the bared end of a cable extends, means on said tubular member to engage said shoulder and hold said member against movement outwardly of said insulator, the space between the tubular member and the cable received therein allowing for free passage of liquid, means carried by the outer portion of said tubular member exteriorly of said shoulder to be grippingly engaged with the cable while permitting free passage of liquid therepast, and means receiving support from the insulator and having a threaded connection with the tubular member to draw the first mentioned means outwardly against the shoulder and thus hold the same firmly with respect to the insulator.

4. In a pot head for connecting electrical cables, the combination with a tubular insulator having a bore of given diameter, terminating in a smaller bore opening at one end of the insulator, whereby to provide a shoulder interiorly of the insulator, of a bushing in said smaller bore having a threaded end extended past said shoulder, a nut engaged with said threaded end adjacent said shoulder, said bushing and nut being apertured coaxially to receive the bared end of the cable with sufficient clearance to afford free passage of liquid through the bushing and nut, and clamping means on said bushing for securing said bared end in said aperture, said bushing being so constructed as to permit the free passage of liquid therepast.

5. In a pot head for connecting electrical cable, the combination with a tubular insulator having an open end provided with an inwardly directed annular flange, a bushing received in said open end portion of the insulator with a part extending from the insulator and provided with means for engaging the inwardly directed flange on the interior and exterior of the insulator thereby to be held against movement in respect to the insulator, said bushing having a centrally disposed bore extending therethrough for receiving the bared end of a cable with sufficient clearance to accommodate the free passage of a liquid, said bushing being threaded adjacent its projecting end, and apertured means co-acting with said bushing and engaged with said threaded end of the bushing to secure the bushing to the cable, the bore through said bushing and the aperture in said means providing a passage-way for liquid when the cable is secured therein.

ALWIN G. STEINMAYER.